Aug. 10, 1937.   L. L. VON KRAMOLIN ET AL   2,089,677
DEVICE FOR TRACING THE MOVEMENTS OF OBJECTS
Filed April 25, 1933   2 Sheets-Sheet 1
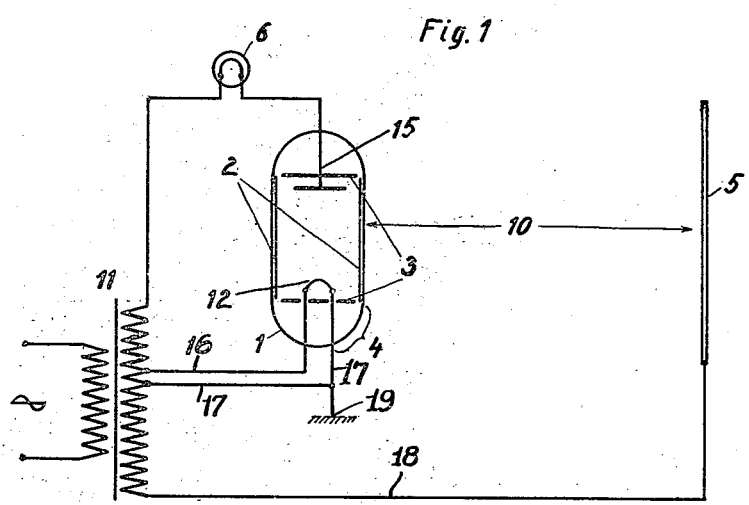
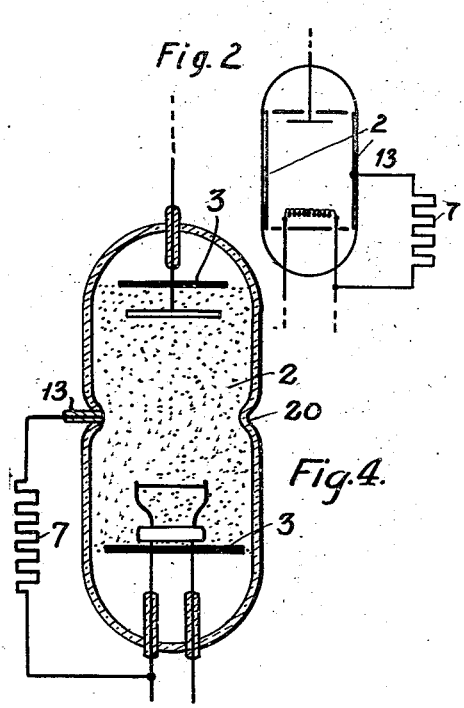
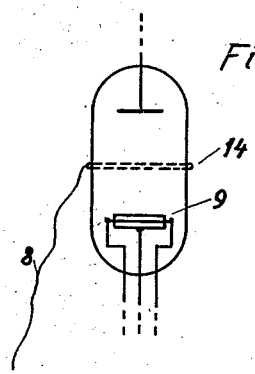
Inventors:

Aug. 10, 1937.    L. L. VON KRAMOLIN ET AL    2,089,677
DEVICE FOR TRACING THE MOVEMENTS OF OBJECTS
Filed April 25, 1933    2 Sheets-Sheet 2
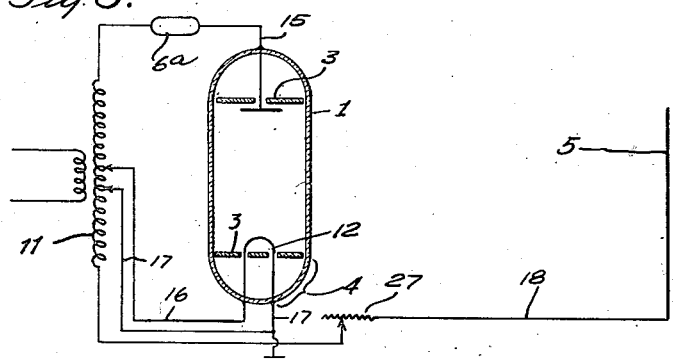
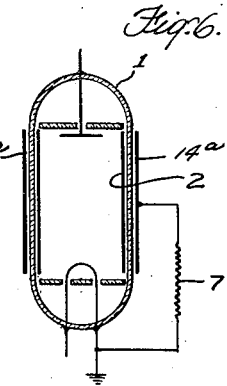
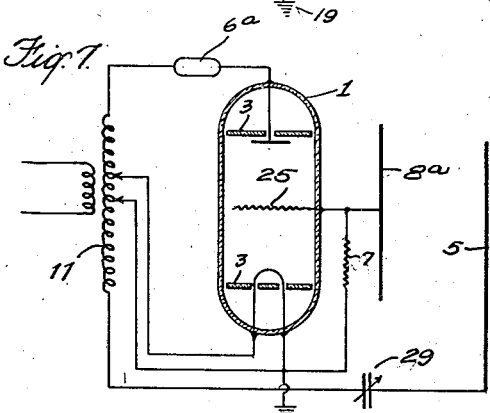
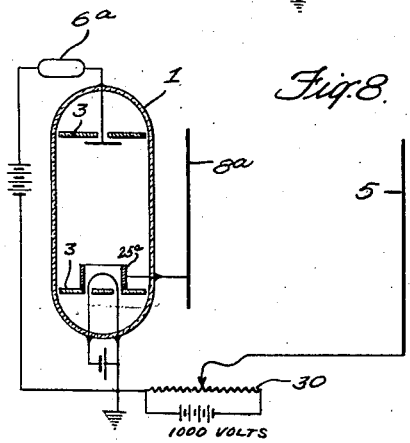
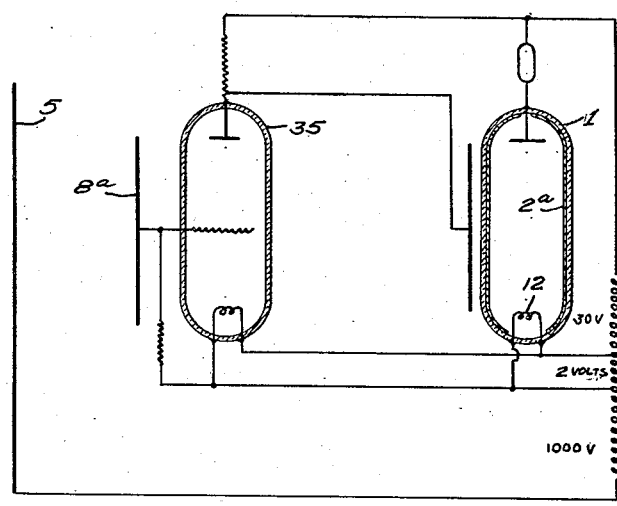
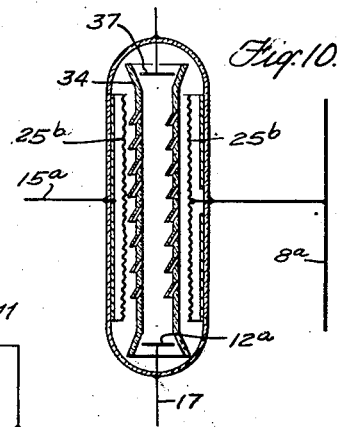
INVENTORS
LEON LADISLAUS VON KRAMOLIN
HANS J. SPANNER
ATTORNEYS Patented Aug. 10, 1937

2,089,677

UNITED STATES PATENT OFFICE 2,089,677

DEVICES FOR TRACING THE MOVEMENTS OF OBJECTS

Leon Ladislaus von Kramolin and Hans Joachim Spanner, Berlin, Germany

Application April 25, 1933, Serial No. 667,852
In Germany April 29, 1932

10 Claims. (Cl. 250—27)

Our invention relates to circuit control devices of the type in which the discharge between electrodes is controlled by a charge maintained near the path of the discharge, more particularly, the invention relates to such devices in which the controlling charge is dependent upon a field established outside of the discharge tube and especially when the field is maintained by an electrode spaced a substantial potential above that of the tube and of the ground.

One object of our invention is to provide an apparatus for determining presence or movement of movable conductors or other bodies which will be sensitive to permit such determination for larger distances than was heretofore practicable, e. g., up to several meters.

Another object of our invention is the provision of such an apparatus in which the instability of adjustment heretofore common to such apparatus is eliminated, whereby a given response may be more reliably indicative of a given condition.

A further object of our invention is to eliminate the delayed response of such apparatus (often referred to as "inertia") which in previous devices of this type has resulted in a response occurring at a different distance when an object is approaching the sensitive device than when it is moving away from the device.

Another object is to make such devices more easily adjustable to produce a given response for a given condition.

Other objects and advantages inherent in our invention will be apparent from the following description taken in connection with the accompanying drawings. In these drawings we have given certain preferred examples of our invention and certain modifications thereof with a view to illustrating our invention and the principles involved therein so that others skilled in the art may fully understand the invention and its application to practical purposes and may be enabled to make other changes and modifications which will best adapt the invention for any particular purpose or use. It should be understood that these drawings and the accompanying description are only illustrative and are not intended to be exhaustive or limiting of the invention.

Fig. 1 is a diagrammatic view of the apparatus including the circuit therefor.

Figs. 2 and 3 are diagrammatic views representing modifications of the invention.

Fig. 4 is a sectional view of a discharge tube suitable for use in connection with the present invention; and Figs. 5 to 10 inclusive are diagrammatic views of other modifications of the invention.

Referring first to Fig. 1, we have indicated by the reference character 11 a transformer, which in the preferred example is adapted to operate from the alternating current supply line at commercial or domestic voltage. The secondary side of this transformer is tapped for three different voltages. The connections 16, 17 supply a low voltage heating current to the incandescent cathode 12 of the gas discharge tube 1. The connections 15 and 17 supply a higher voltage to the principal electrodes for establishing the discharge in the tube 1. The connection 18 to the antenna or other outside electrode 5 creates a high potential between this electrode and the tube 1. The cathode lead 17 is preferably grounded as shown at 19.

The connection 15 includes the working portion of the circuit, e. g., a signal lamp 6.

The discharge tube 1 is further provided with a coating 2 on the wall thereof and mica rings 3 are provided in the present case shown as supported behind the electrodes on the lead-in wires. The incandescent cathode 12 consists of nickel or similar material and is activated as known in the gas tube art by barium or similar alkaline earth metals.

If the potential applied to the outside electrode 5 is suitably adjusted with respect to the potential on the main electrode supplied through the connection 15, 17, and with respect to the distance 10, a field will be established between the outside electrode 5 and the intermediate control electrode 2 which will be just sufficient to suppress the discharge or to allow only a given limited discharge. If now any object is brought into the field thus established, the charge on the intermediate electrode 2 will be sufficiently varied so that the conditions of the discharge will be affected. As will be later explained, this may result in a sudden starting or extinction of the discharge or it may result in a gradual increase or decrease of the discharge, depending upon the circuit arrangement. In any case the response of the discharge indicates the presence of an object within the field between the electrode 5 and the discharge tube 1, and it may also indicate its distance from the center of the field.

In most cases gas discharge tubes rather than vacuum tubes should be used on account of the far greater intensity of the current obtainable. Ordinarily, however, such gas filled tubes are not influenced by any control potential when once the discharge has started; it is advisable, therefore, to use alternating or pulsating continuous current for the supply of such tubes, since with such current the discharge is repeatedly extinguished and restarted and a disturbance of the field affecting the charge on the intermediate electrode 2 may thus influence the restarting of the tube. The device will be more certainly responsive to such control, particularly with higher frequencies, if as shown the tube is made with only one cathode so that the discharge operates only on a half-cycle. If, however, the device is to be responsive only to a given disturbance of the field and not to the return of the field to its original condition it may then be desirable to use direct current.

In our experience with devices of this type we have found that certain additional drawbacks may occur which may be eliminated by the present invention.

It is to be understood in the first place that, under the influence of the control field, negative electric charge carriers, i. e., chiefly electrons, accumulate on the wall of the vessel. These electrons accumulating on the inside wall of the tube itself or upon a conducting wall-coating produce a charge which has a controlling effect on the discharge.

We have found that the dimensions of the tube constitute a very important factor in obtaining a favorable controlling effect. Thus, if the tube is made very large these wall charges may be so far removed from the path of the discharge between the anode and cathode, and especially from the space charge surrounding the cathode in the initial state of the discharge that the sensitivity of the arrangement becomes very small. If, on the contrary, the tube is made too narrow then the wall charges are easily neutralized by the discharge; and in this case also the tube does not attain the desired sensitivity.

To obtain the best results we have found that the walls of the tube which surround the discharge should be spaced from the axis of the discharge not more than about double the length of this axial line nor less than about one-tenth of the length of this axial line.

A very important feature of the combination illustrated in Fig. 1 is the placing of the control electrode 5 at a distance from the tube which may be much greater than the maximum sensitivity distance of capacity cells known to the prior art, e. g., as described in the application of Ostermeier and Michel, Serial No. 580,208, filed December 10, 1931, Patent No. 2,027,399 issued January 14, 1936. This distance may, for example, be from one to ten centimeters up to one to several meters.

As a specific example, the discharge tube 1 may be filled with a rare gas, e. g., argon of $\frac{1}{10}$ millimeter pressure, the potential between the electrode leads 15 and 17 may be about 30 volts and the extension of the secondary winding connected to the outside electrode 5 is adapted to supply a charge of about 1,000 volts to the outside electrode.

Under these conditions and with the incandescent cathode at its full emission temperature a strong current of the order of about one ampere may pass through the tube and light the incandescent lamp 6 or otherwise operate the working portion of the circuit.

If the conductor 5, while connected to the transformer so as to be charged to a substantial potential with respect to the electrode of the tube 1, is moved toward and away from the tube, a position will be found where the discharge of the tube is extinguished. When the distance of the outside electrode 5 from the tube 1 is made greater than this critical distance the discharge of the tube continues in the normal way, whereas if the distance is made smaller the discharge in the tube is suppressed. The "critical distance" of the conductor 5 from the tube 1 as described above is that at which the discharge in the tube has just been suppressed. If the electrode 5 is held at this critical distance, a field is established between it and the tube 1 and any object entering this field, i. e., approaching the system formed by the tube 1 and the electrode 5, will affect the field and thereby permit the starting of the discharge. For example, with the dimensions and specifications stated the critical distance of the outside electrode will be between two and six meters from the tube. With the electrode thus positioned a body brought to a distance of about two meters from the system will cause the discharge in the tube to start instantly. In general, with the electrode positioned at this critical distance, the discharge will start when a body has entered the field between the tube and the electrode.

This phenomenon may be explained by the fact that the potential of the electrode 5 causes negative charges to accumulate on the inside wall of the tube which then has the effect of a negatively charged grid in the tube and therefore suppresses the discharge. If a body approaches the tube, especially if brought into the field between the electrode 5 and the tube 1, a part of the field lines are deflected and no longer affect the tube 1 in the same way; and thus the wall charges dependent upon this field are decreased, permitting the discharge to restart.

An increase of the potential applied to the electrode 5, with the other conditions and dimensions remaining the same, will increase the critical distance of the electrode and therefore the range of the system; and correspondingly a decrease of the potential applied to the electrode will decrease the critical distance of the electrode and therefore the range of the system. We have found charges for the electrode 5 of from about some hundreds to some thousands of volts to be a suitable range.

Another feature of our invention overcomes one of the chief disadvantages of this type of apparatus as known before our invention, namely, that an exact adjustment of the sensitivity and range is difficult because the discharge in the tube starts at a different distance when a body is approaching the system than the distance at which the discharge is extinguished when the body is again moved away from the tube. Thus, for example, if the system without this feature were adjusted so that a discharge starts when the body is at a distance of three meters from the tube, it might be extinguished again only after the body had reached a distance of four or five meters from the tube.

We have now discovered that this behavior is due to the fact that the charges accumulated on the wall of the tube 1 cannot be removed fast enough when the object approaches the system and deforms its field. This is evidenced by the fact that such a system shows certain characteristics of "inertia" and does not react so well on a very fast movement of the body as with a slower one.

We have also observed that these phenomena occur in varying degrees according to the type of glass used for the tube; and we have determined that the conductivity of the glass plays an important role as a biasing or leakage resistance 4 from the coating 2 to the cathode 12. With certain designs and certain glasses the conductivity or resistance of the glass may reach a more or less favorable value and where this value for the glass alone is not satisfactory a separate resistance member providing a leakage path from the intermediate control electrode to the cathode may be provided.

Since the surface of the tube wall or the control electrode 2 has a certain capacity, and the biasing resistance represented at 4 has a certain conductivity or resistance, it is clear that this system must show a definite time-constant. With a given biasing resistance this time-constant will be the greater the greater is the capacity of the wall surface or coating 2; and with a given capacity the time-constant will be the greater the smaller is the conductivity of the glass.

We have found that the most favorable condition for the system is when this time-constant is adapted substantially to correspond with the time required to perform the fastest movement of the object which is to be detected, i. e., its fastest movement across the field. It is important, however, not to make the capacity too great since with a given field strength and with a given amount of charge carriers, the higher will be the tension which may be obtained the smaller are the capacities. On the other hand, the amount of the capacity between the external electrode 5 and the intermediate electrode 2 is decisive of the value of the control charge on the tube walls. Thus, for a given distance certain favorable capacity values result and the adjustment to attain the desired time-constant, as already discussed, should, therefore, be made by adapting the biasing resistance (4 in Fig. 1) to the capacity which has been chosen upon the other considerations.

Another feature of our invention goes still farther and cures another important drawback of such tubes as have been known to the prior art, namely, that they do not behave in the same way for indefinite periods of time. Thus, we have observed that tubes which in the beginning were unfavorable, later became favorable, and after some further time again lost their favorable behavior. We have discovered and demonstrated that this variation is due to a variation in the condition just discussed which results from alterations in the tube during operation.

For example, assuming a system of this kind in which the capacity of the wall lining was of the order of about ten to twenty microfarads while the biasing resistance was about one hundred to two hundred megohms. If this were an open tube without the shield 3, a certain amount of sputtered or evaporated electrode material might be deposited upon the tube wall between the conductive coating 2 and the cathode lead wire, i. e., within the range marked by the line 4. Thus the conductivity over this surface is increased and the biasing resistance decreases without any compensating alterations in the capacity of the intermediate electrode 2, by which the time-constant of the system could be maintained.

To avoid such an undesired alteration of the time-constant of the system, the mica rings 3 or other screens or shields are provided behind the electrodes, viz., on the cathode as well as on the anode. These substantially prevent the depositing of electrode material on the tube wall around the lead-in wires for the electrode and thus the resistance during operation may be maintained substantially stable.

In order to give the cathode a fixed potential as to the environment and thus also to obtain a regular bias it is advantageous to connect the cathode to the ground, as shown in Fig. 1.

As already stated, it is not always desirable to use the glass of the tube wall as the sole biasing resistance. In fact, it is ordinarily desirable to make the tubes of highly insulating glass such that the conductivity of the glass is smaller than that necessary for the biasing resistance and then by special lead-in wires 13, e. g., as shown in Figs. 2 and 4 to connect the intermediate electrode or inner wall coating 2 of the tube with the cathode through a resistance 7 which can be chosen of any desired value in order to meet the other requirements of the system.

Instead of the inner wall coating 2 as shown in these figures a bare wall can be used without any metallic lining and as already mentioned above charges can be accumulated on these bare walls. This is particularly important where it is desirable to maintain transparency and make use of the light produced by the discharge.

It is possible, however, to maintain transparency of the tube wall even with conductive coatings if only a very thin metallic coating is applied to the wall. These coatings may also be desirable since they serve as filters to limit the light emission to certain colors or ranges of the spectrum. Furthermore, instead of conductive linings on the inside of the tube conductive coatings outside of the tube or coatings both on the outside and the inside may be used. Specific examples of these alternatives are shown, for example in Fig. 3 where a narrow band 14 on the outside of the tube, with the inner wall of the tube bare, serves as the intermediate control electrode. In Fig. 5 a bare inner wall without outside electrode is shown, and in Fig. 6 both outer and inner coatings 2 and 14a are shown. In this latter figure the outside coating is connected to the cathode through the biasing resistance 7; and we have found that it is not necessary in this case to provide a separate bias for the interior coating. Probably the transverse resistance through the glass offers a bias also for the inner coating.

Where conductive coatings are used on the inner walls these may be formed by known methods or by sputtering or by spraying of the cathode metal onto the glass wall. The coating may serve a double purpose if the metal used is a getter, that is a metal adapted to "clean up" impurities from the gaseous atmosphere.

Fig. 3 illustrates another important modification, namely, the use of an external electrode or antenna 8 directly connected to the intermediate electrode, the rings 14 of Fig. 3 or the lead-in wire 13 of Fig. 2. In this way the field between this external electrode 8 and the outside electrode 5 may be at a distance from the tube itself and may influence the intermediate electrode through the conductor by which the intermediate electrode is connected with the external electrode 8. The use of such an external electrode also increases the sensitivity of the device by increasing the capacity between the electrode 5 and the tube. It is desirable to have these two external electrodes 5 and 8 of about the same length and parallel; and they may, for example, be made of thin wire. For example, extremely good sensitivity may be obtained with the electrodes 5 and 8 each about two meters long stretched in parallel direction and at a distance of about six meters from each other. The conductor 8 may be held directly vertically and upward from the tube and the conductor 5 parallel at the said distance.

As already mentioned above it is important in these tubes, on the one hand to bring the wall charge as near as possible to the discharge and especially to the cathode, whereas on the other hand, a neutralization by ions must so far as possible be avoided. Chimneys (i. e., special pieces of tubing 34) may be inserted into the discharge vessel similarly as in the so-called "wall current" or "side current", amplifiers (tubes with a current of electrons which is controlled in a direction perpendicular to the direction of the main discharge path). In this way it is possible to use very narrow tubes and still have a very favorable controlling action, the ions which might have a neutralizing effect are kept away from the grid charged with electrons by these chimneys. We have illustrated such an arrangement in Fig. 10.

In Fig. 4 we have shown an advantageous constructional arrangement, namely, the inward bulge or constriction 20 in the tube wall. This is particularly advantageous in connection with the outside band 14 as shown in Fig. 3 since the groove serves to hold this band in place; or as shown in Fig. 4 the intermediate electrode can be connected by a lead-wire sealed through the bulge and thus connected to the inner wall lining.

Also instead of wall coatings, grids may be used, e. g., as shown in Fig. 7 and such grids may be of bare conducting material or have an insulating covering. The grid 25 in Fig. 7 is connected by a lead-wire sealed through the side of the tube to the external electrode 8a.

We have found that a further desirable control of the behavior of the tube can be effected by including a suitable impedance between the outer electrode 5 and its source of potential, e. g., the secondary of the transformer 11. In Fig. 5, we have shown a high ohmic resistance 27 which, as indicated in this figure, may be a variable resistance to provide a suitable adjustment for the system, which may avoid the necessity of moving the electrode 5 or making other more complicated changes in the circuit arrangement. In the specific example given above the resistance 27 may be of the order of about 20 megohms.

According to the value of this resistance 27 the tube may be made to switch on its discharge suddenly and as suddenly extinguish it or it may be made to increase gradually up to full strength and again to decrease gradually. With a resistance of 20 megohms in the given example there will be a sudden on and off operation, whereas with smaller resistances or with no resistance in the connection to the outer electrode 5 the discharge passes gradually from full stoppage to full current. Thus, where the tube is to be used not merely as an indicator but to some extent as a distance meter to record the degree of approach of a body, a small resistance or no resistance at all should be used so that the nearness of the approaching body may be indicated by the intensity of the discharge. On the other hand, if the device is to be sensitive to the approach of an object to a given limit it is expedient to use a resistance, e. g., of the value of about 20 megohms. If the high resistance is made variable, an adjustment of the sensitivity may be provided by varying the resistance, and the position of the conductor 5 for this purpose need not be altered.

Instead of the ohmic resistance or also in addition to the resistance a capacity, e. g., a small rotary plate condenser or other variable capacity may be connected in the line to the outer electrode 5 and may serve as the adjustment. This I have indicated at 29 in Fig. 7. For purposes of adjustment other variable expedients may be used or a variable source of potential, e. g., an adjustment of the secondary winding of the transformer 11 which is connected to the electrode 5 or the use of a supplemental adjustable source of potential, e. g., the potentiometer 30 shown in Fig. 8, or any other means may be used by which the potential on the electrode 5 is varied.

As already mentioned it is not absolutely necessary to use gas discharge tubes, because also vacuum tubes may be employed, but the effects obtained by the latter are considerably smaller and especially the intensity of the current supplied by a vacuum tube is extremely small. However, the combination of vacuum tubes with gas discharge tubes may be suitable, the vacuum tube 35 in this combination serving with the outside electrode 5 as the element sensitive to the field and the plate circuit of the vacuum tube being used to influence the control electrode of a gas discharge valve. This may, for example, be as shown in Fig. 9.

If no very high current intensity is required, e. g., for the operation of signal lamps 6, relays 6a, etc., cold cathode tubes may also be used instead of the incandescent cathode tube as described and shown. Such cold cathodes may advantageously be activated by alkali or alkaline earth metal in a manner already known to the art of gas discharge tubes. The discharge tube may also be filled with gas, e. g., rare gas, metal vapor, e. g., mercury vapor, or a gas and vapor mixture.

Where several tubes are combined, e. g., as shown in Fig. 9 and described above, the preceding tubes can be combined with the main tube to form a unit according to the well known principles of multiple valves. If such multiple unit is provided with a common gas space, then the preceding tube which is used with the gas filled end tube must also be a gas discharge tube. This offers no difficulty in the case of alternating current.

For continuous current the preceding tube or both the preceding and the main tube should be constructed according to the "wall current" or "side current" amplification principle, e. g., as shown in Fig. 10, or be fitted with control electrodes 25a in Fig. 9 respectively which are removed from the respective main electrodes 12 by a distance which is smaller than the mean free path of the ions with respect to the existing gas pressure in order that a regulating effect may be possible. Otherwise, a single start of the discharge would destroy the control effect of the intermediate electrode and the device would have to be manually switched off after each response.

Also where preceding tubes are used in such combination the time-constant of the biasing resistances of the tubes must naturally correspond approximately with the time-constant of the main valve and answer to the above indicated regularity.

If alternating or pulsating continuous current is used, which is chiefly done when using gas discharge tubes, the frequency must be chosen in such a way that the cycle period is high as compared with the greatest speed of the body, the movement of which is to be detected. Otherwise disturbing interferences may occur.

If a tube as described and shown in Figs. 1 to 3 for example is very critically adjusted, then by tilting oscillations flickering effects of the tube may be obtained in such a way that the tube in a certain time sequel starts and extinguishes again. The tilting oscillation also seems to be produced by the effect of the capacities and the resistance of the control circuit (wall coating and biasing resistance). In the condition of the tilting oscillation the tube is on the point of its maximum sensitivity in which state the approaching and moving away of a body may be detected even at a relatively great distance by the fact that the cycle of these tilting oscillations alters. By making these alterations perceptible even small movements of relatively far distant objects may be detected.

Where a relay is to be used in the working circuit, e. g., as at 6a, with an alternating current or a pulsating continuous current, e. g., of about 40 to 60 cycles as in the common domestic supply line, there would be strong vibrations of any simple magnetic relay, if directly connected into the anode circuit of the tube, unless specially adapted to this intermittent current. This may be accomplished, for example by connecting large electrolytic condensers of the order of 1,000 microfarads or more in parallel with the magnetic coils of the relay. A simpler arrangement especially suitable for operation with such gas discharge tubes results from using the extension and contraction of a heated tungsten filament for the making and breaking of a contact in a vacuum. Such a thermal relay has the advantage that its "inertia" is sufficiently great that it does not respond to the single half cycle of such an alternating current, whereas the radiation of heat from the filament is sufficiently high so that the "inertia" does not interfere with the majority of practically occurring cases, and the speed of operation is sufficient for nearly all purposes. This arrangement also has the well known advantages of a vacuum switch due to the fact that its contacts are in a vacuum.

Although we have shown in the accompanying drawings and described above various modifications of our invention we do not limit ourselves to these modifications but may employ other embodiments within the sphere and scope of our invention.

Having described our invention what we claim is:

1. A circuit control device sensitive to the movement of an object relative thereto which comprises an electrical discharge device having an envelope enclosing the discharge space and the principal electrodes therein adapted to carry the discharge current, control means adapted at least in part to serve as an electrode intermediate said principal electrodes to affect the charge within the envelope which determines the potential between the principal electrodes required for initiation of a discharge and adapted at least in part to serve as an electrode for an external field, an outside electrode positioned at a substantial distance from the said control means, and means for charging said outside electrode relative to a principal electrode and thereby creating a field between the outside electrode and the control means, in which at least one of the principal electrodes is an electron emissive activated cathode.

2. A device for detecting objects which comprises an electrical discharge device having an envelope enclosing the discharge space, a gaseous filling adapted to carry the discharge, principal electrodes adapted to carry the discharge current and a control means adapted to serve as a control to determine the potential at which the discharge passes between the principal electrodes and as an electrode for an external field and comprising a metal film on the inner wall of the envelope, an outside electrode spaced from the control means, a source of current for the discharge, means connecting the principal electrodes to said source through a working circuit, a ground connection for one of said principal electrodes, means for maintaining the outside electrode at a potential substantially beyond that of the principal electrodes, a high resistance leakage connection from the control means to a principal electrode and shields adapted to protect from the discharge and from the electrodes the part of the envelope between the metal film and the principal electrodes.

3. A circuit control device sensitive to the movement of an object relative thereto which comprises an electrical discharge device having an envelope enclosing the discharge space and principal electrodes therein adapted to carry the discharge current, control means adapted at least in part to serve as an electrode intermediate said principal electrodes to affect the charge within the envelope which determines the potential between the principal electrodes required for the discharge and adapted at least in part to serve as an electrode for an external field, and a substantially constant high impedance leakage path from the intermediate control electrode to one of the principal electrodes.

4. A device as defined in claim 3 in which the intermediate control electrode is a conductive layer inside of the envelope, and the high impedance leakage path comprises a lead-in connection through the wall of the envelope and a high resistance connected thereto.

5. A circuit control device sensitive to the movement of an object relative thereto which comprises an electrical discharge device having an envelope enclosing the discharge space and principal electrodes therein adapted to carry the discharge current, control means adapted at least in part to serve as an electrode intermediate said principal electrodes to affect the charge within the envelope which determines the potential between the principal electrodes required for the discharge and adapted at least in part to serve as an electrode for an external field, and shields between the electrode and the parts of the envelope insulating them and from the intermediate control electrode, whereby to prevent decrease of leakage impedance thereacross by deposit of electrode material thereon.

6. A circuit control device sensitive to the movement of an object relative thereto which comprises an electrical discharge device having an envelope enclosing the discharge space and the principal electrodes therein adapted to carry the discharge current, control means adapted at least in part to serve as an electrode intermediate said principal electrodes to affect the charge within the envelope which determines the potential beween the principal electrodes required for initiation of a discharge and adapted at least in part to serve as an electrode for an external field, an outside electrode positioned at a substantial distance from the said control means, and means for charging said outside electrode relative to a principal electrode and thereby creating a field between the outside electrode and the control means, in which the means for charging the outside electrode includes an impedance connection thereto.

7. A circuit control device sensitive to the movement of an object relative thereto which comprises an electrical discharge device having an envelope enclosing the discharge space and the principal electrodes therein adapted to carry the discharge current, control means adapted at least in part to serve as an electrode intermediate said principal electrodes to affect the charge within the envelope which determines the potential between the principal electrodes required for initiation of a discharge and adapted at least in part to serve as an electrode for an external field, an outside electrode positioned at a substantial distance from the said control means, and means for charging said outside electrode relative to a principal electrode and thereby creating a field between the outside electrode and the control means, in which the means for charging the outside electrode includes a variable impedance connection thereto.

8. A circuit control device sensitive to the movement of an object relative thereto comprising an electrical discharge device having an envelope enclosing the discharge space and principal electrodes therein adapted to carry the discharge current, control means adapted at least in part to serve as an electrode intermediate said principal electrodes to affect the charge within the envelope which determines the discharge and adapted at least in part to serve as an electrode for an external field and an alternating current source of frequency sufficiently high that one cycle is shorter than the shortest period in which the object may be expectd to move through the field from a position at which the device is to respond to its presence to a position where the device can no longer respond.

9. A device as defined in claim 3 in which the capacity of the control means and the resistance of the leakage path are proportioned to give a time-constant less than the time required by the object to move through the field to a position at which the device is to respond to its presence.

10. A device as defined in claim 3 in which the capacities of the intermediate control electrode and the capacity of the external field are proportioned to give a desired control charge on the intermediate electrode and the resistance of the leakage is adjusted relative thereto to give a time-constant less than the time required by the object to move through the field to a position at which the device is to respond to its presence.

LEON LADISLAUS von KRAMOLIN.
HANS JOACHIM SPANNER.